W. J. CUNNINGHAM.
MACHINE FOR CAPPING BOTTLES.
APPLICATION FILED MAY 1, 1908.
934,794.
Patented Sept. 21, 1909.
10 SHEETS—SHEET 1.
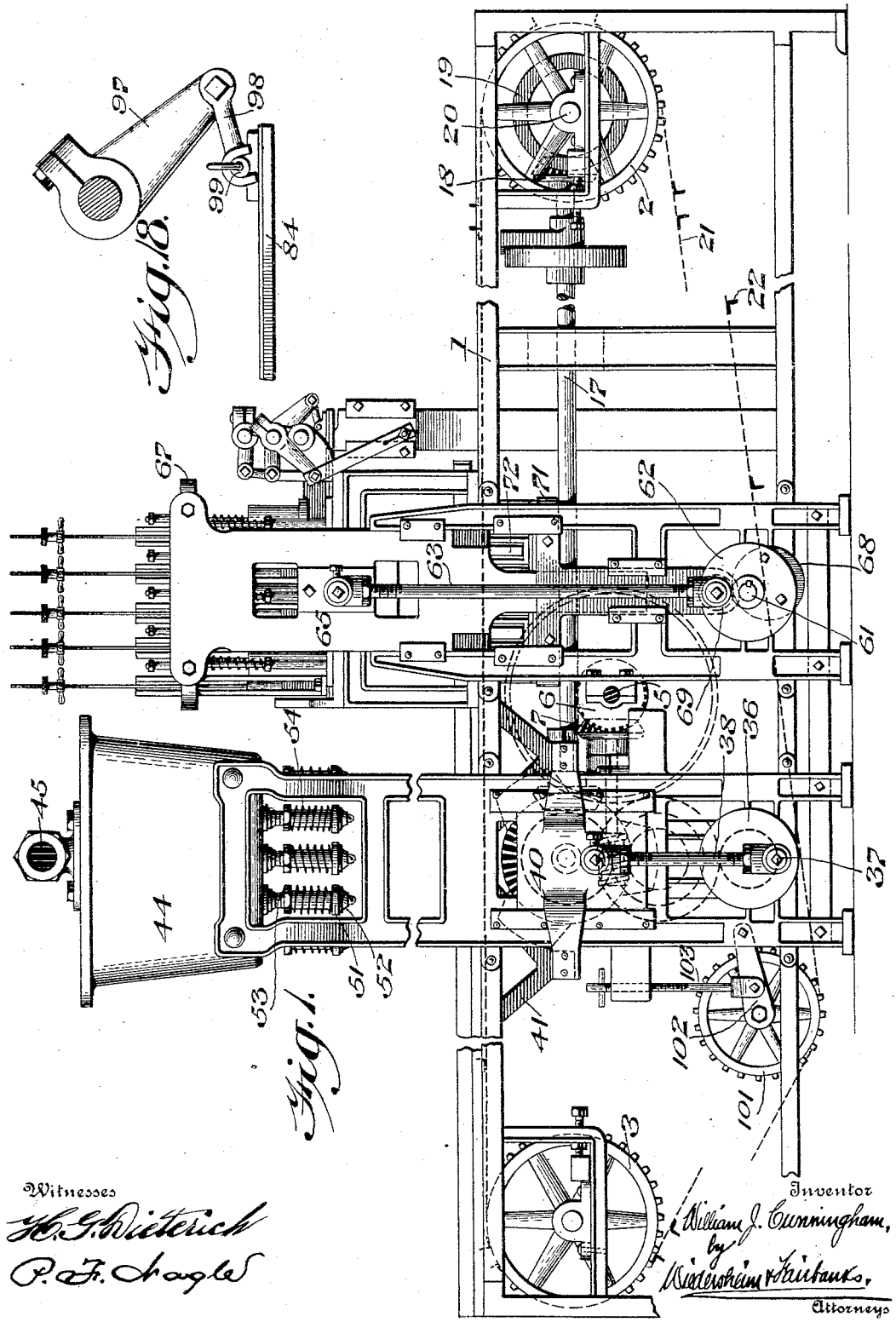
Witnesses
H. F. Dieterich
P. F. Nagle
Inventor
William J. Cunningham,
by
Wiedersheim & Fairbanks,
Attorneys

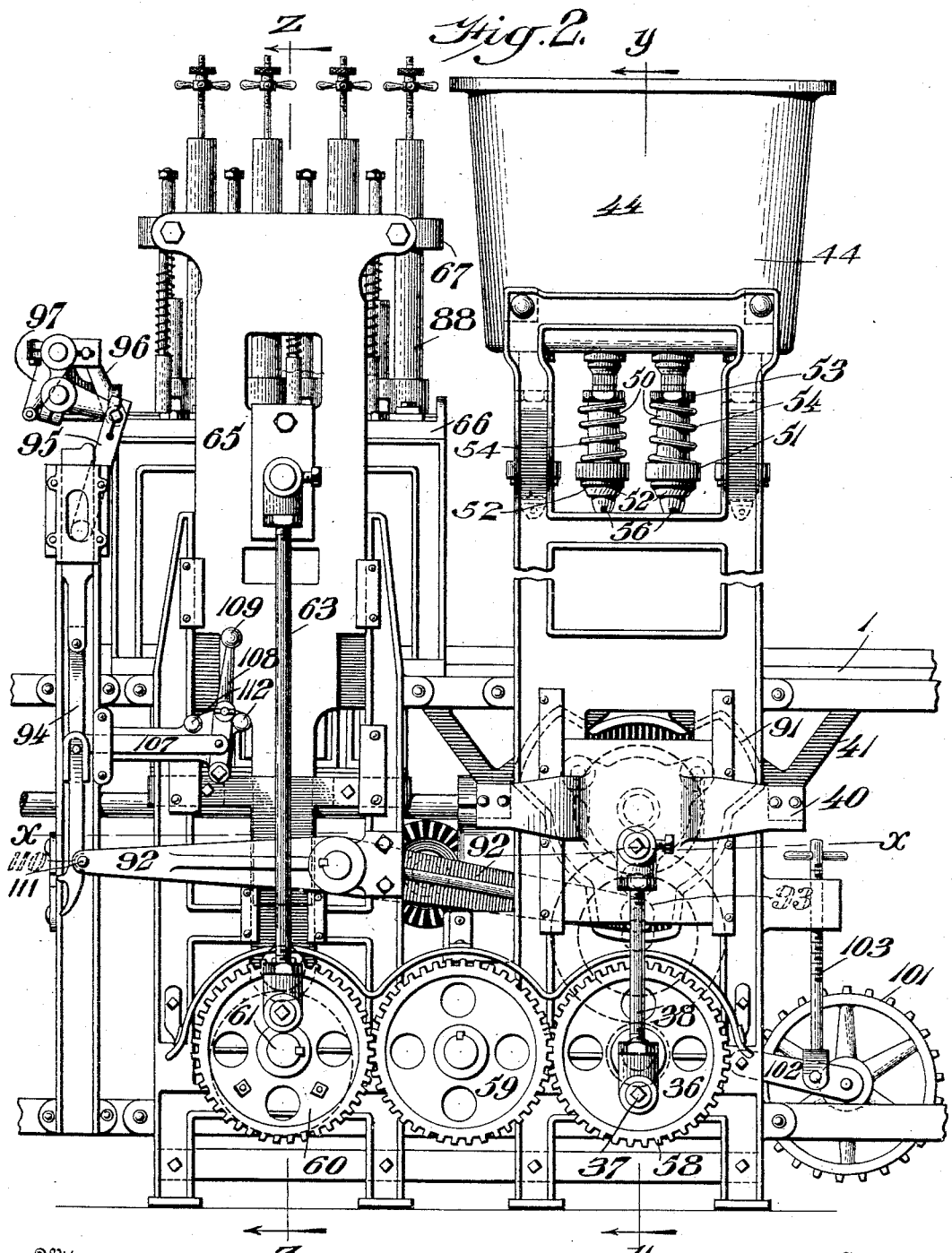

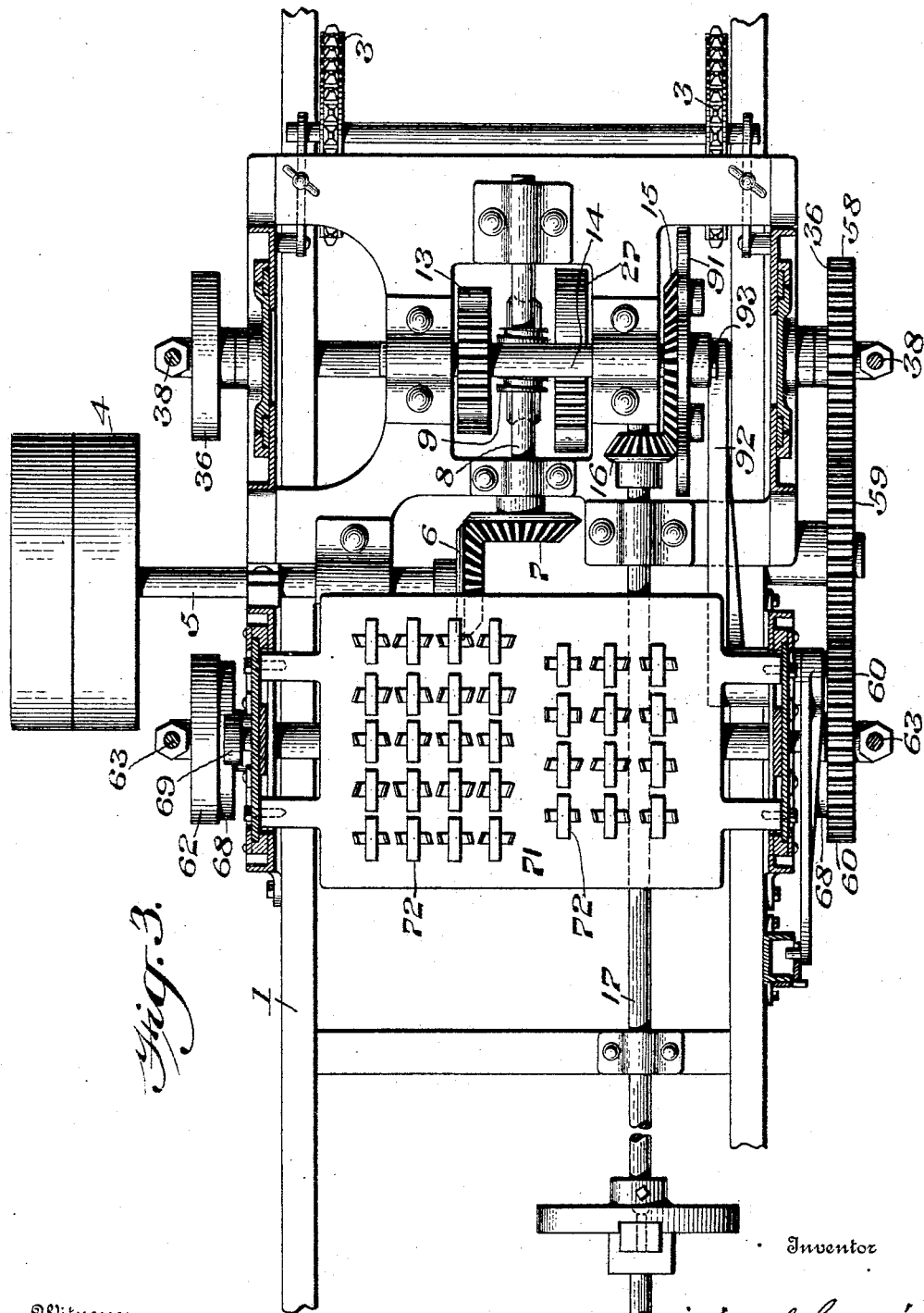

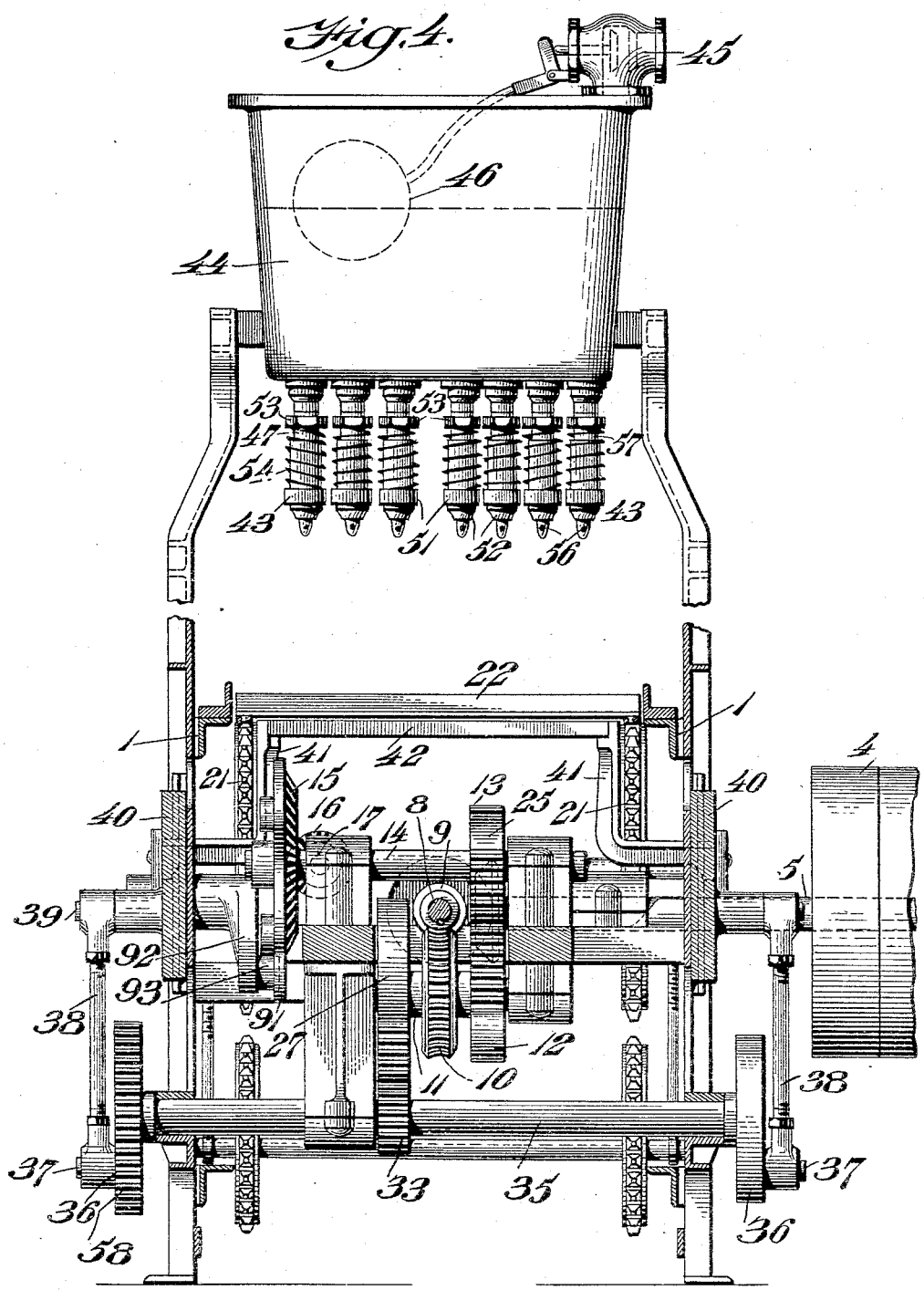

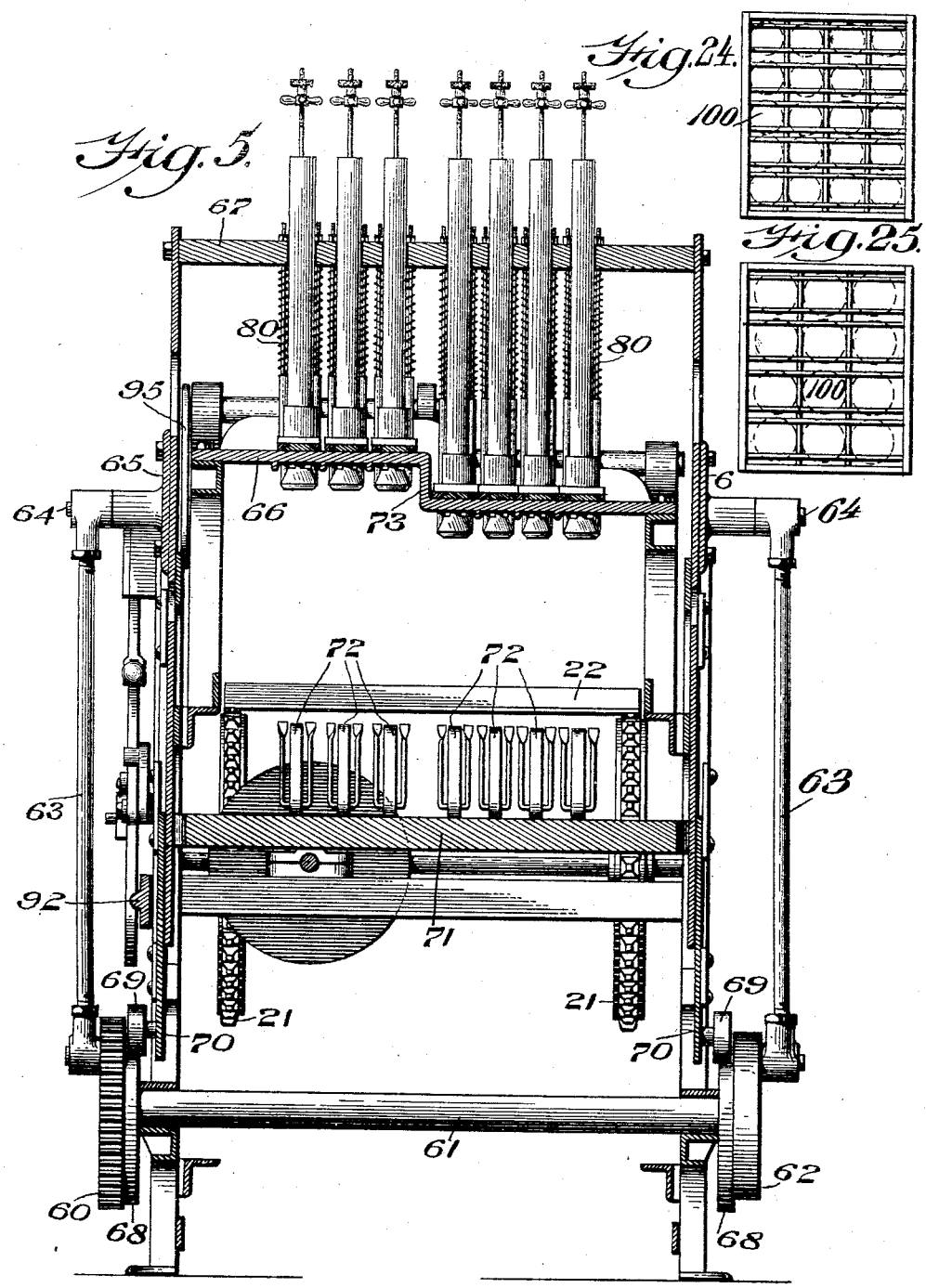

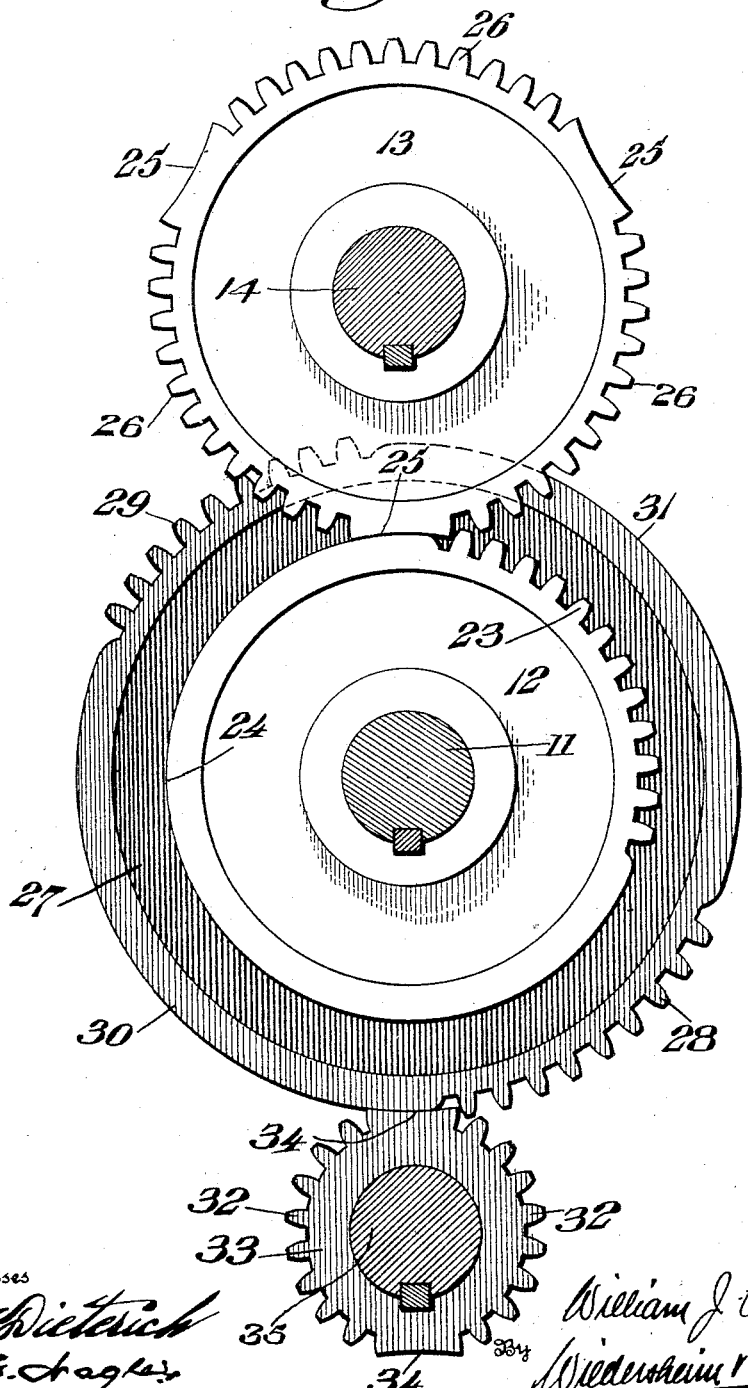

W. J. CUNNINGHAM.
MACHINE FOR CAPPING BOTTLES.
APPLICATION FILED MAY 1, 1908.
934,794.
Patented Sept. 21, 1909.
10 SHEETS—SHEET 7.
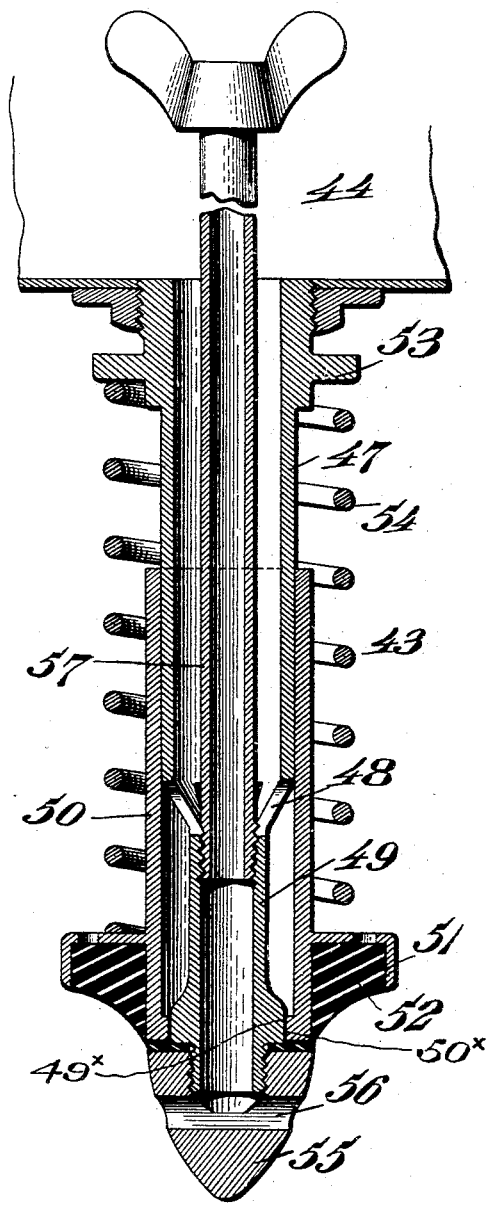
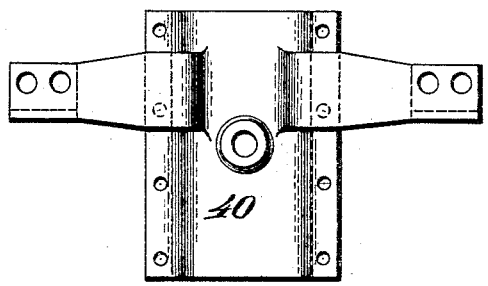
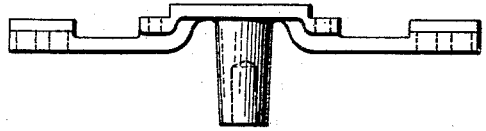
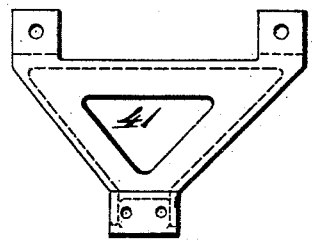
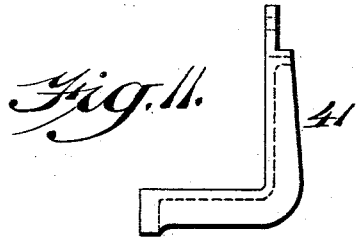
Witnesses
H. G. Dieterich
P. F. Nagle
Inventor
William J. Cunningham,
By Wiedersheim & Fairbanks
Attorneys

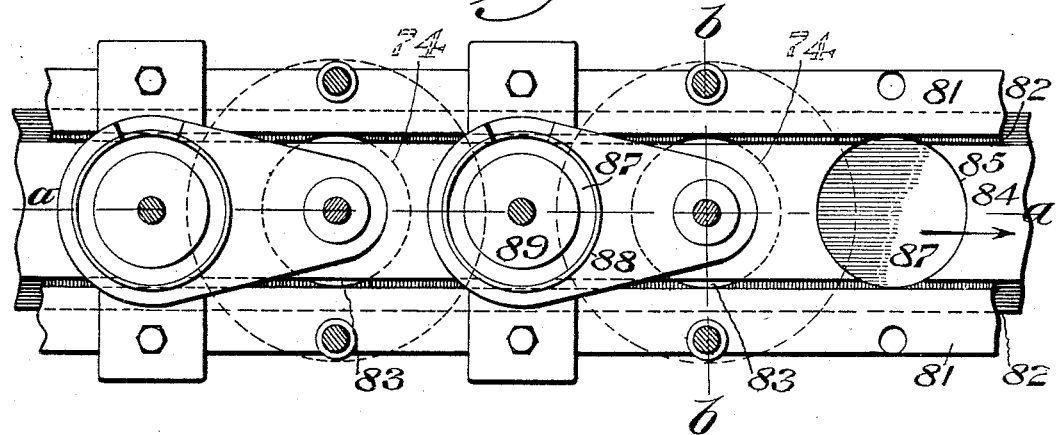
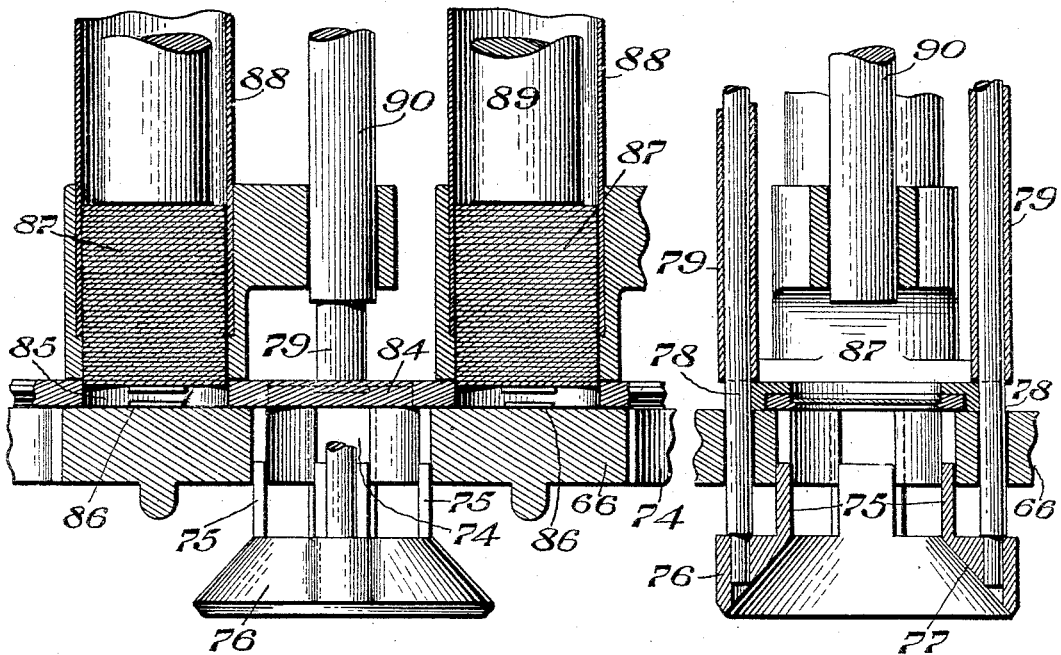
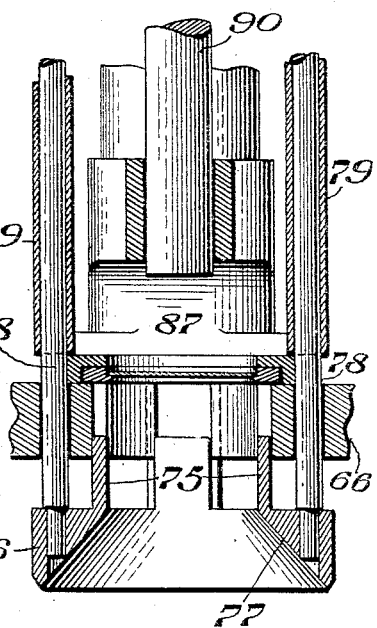

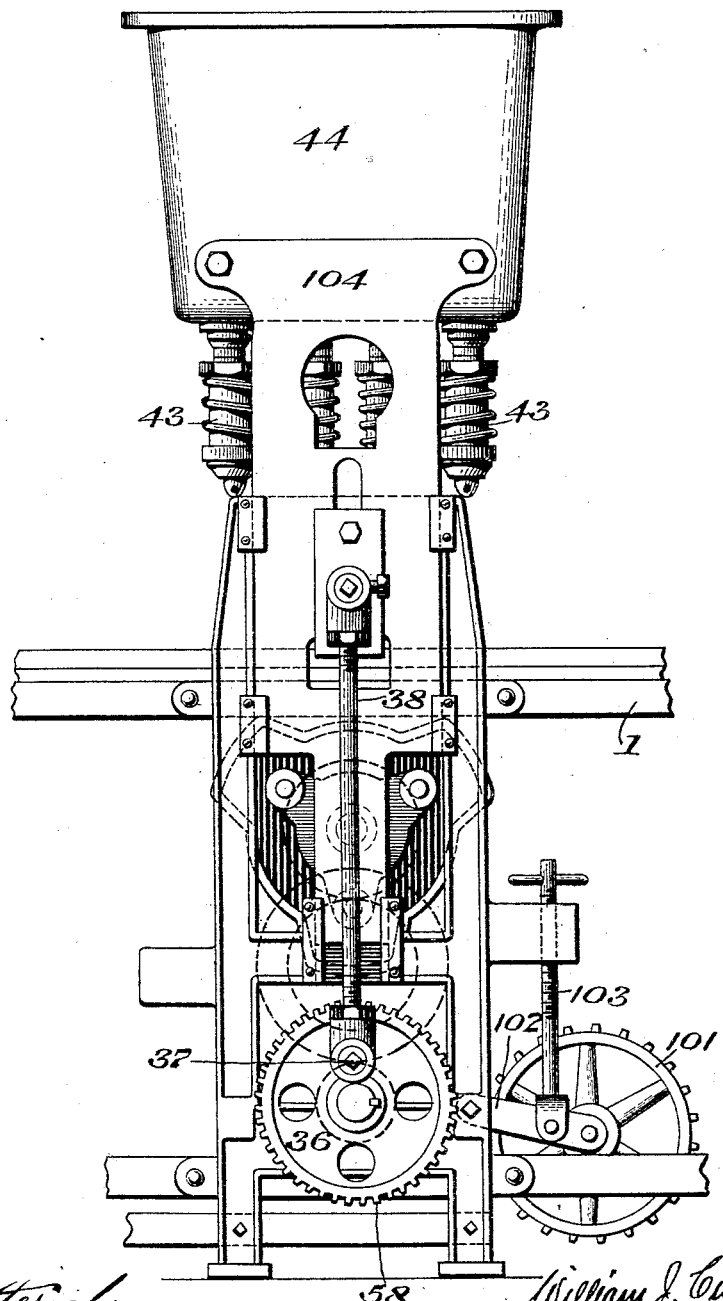

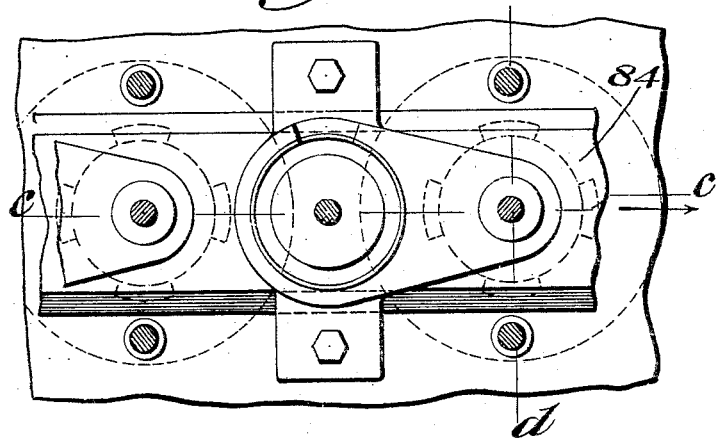
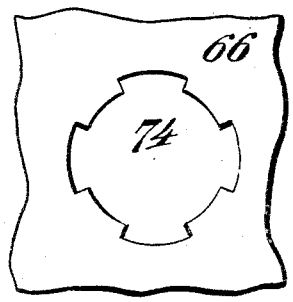
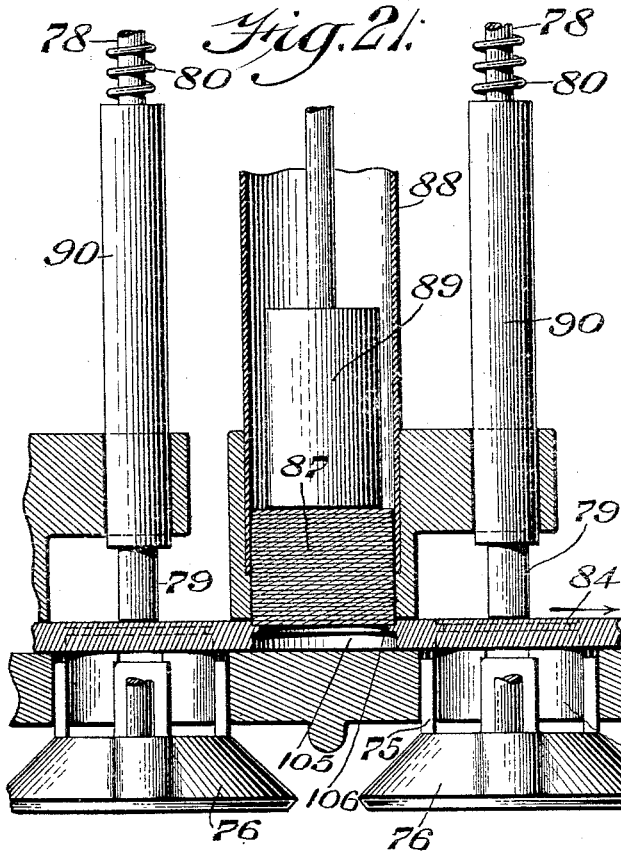
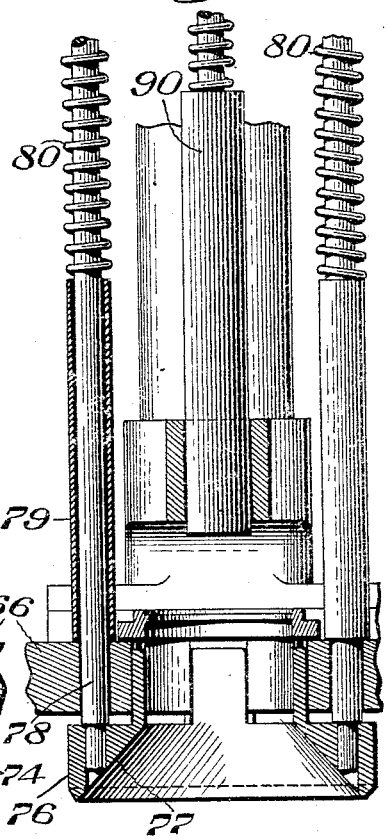

UNITED STATES PATENT OFFICE.

WILLIAM J. CUNNINGHAM, OF PHILADELPHIA, PENNSYLVANIA.

MACHINE FOR CAPPING BOTTLES.

934,794.   Specification of Letters Patent.   Patented Sept. 21, 1909.

Application filed May 1, 1908. Serial No. 430,404.

*To all whom it may concern:*

Be it known that I, WILLIAM J. CUNNINGHAM, a citizen of the United States, residing in the city and county of Philadelphia, State of Pennsylvania, have invented a new and useful Machine for Capping Bottles, of which the following is a specification.

My present invention relates to bottle capping machines and consists in means for placing a plurality of bottles in position beneath the filling means, actuating the latter at the proper time so that the bottles are filled and then placing the bottles beneath the capping means and actuating the same at the proper time so that the bottles are capped.

It further consists of means for automatically actuating the conveyer and stopping the same for a predetermined period so that the bottles are filled, moved forward and capped.

It further consists of means for automatically bringing the bottles and the filling means into proper operative position and for holding the same in position a predetermined time.

It further consists of means for automatically bringing the capping device and the bottles into operative position and for holding the same therein a predetermined time.

It further consists of other novel features of construction, all as will be hereinafter fully set forth.

Figure 1 represents a side elevation of a filling and capping machine embodying my invention showing the frame and conveyer broken. Fig. 2 represents a side elevation upon an enlarged scale taken from the opposite side from that of Fig. 1, of a portion of the machine. Fig. 3 represents a sectional view on line $x$—$x$, Fig. 2. Fig. 4 represents a sectional view on line $y$—$y$, Fig. 2. Fig. 5 represents a sectional view on line $z$—$z$, Fig. 2. Fig. 6 represents a view of the actuating means showing the shafts in section. Fig. 7 represents a sectional view of a valve for the filling means. Figs. 8, 9, 10 and 11 represent detailed views, detached, of mechanism for lifting the boxes, containing the bottles to the valves of the filling means. Fig. 12 represents a plan view of a portion of the capper. Fig. 13 represents a section on line $a$—$a$ Fig. 12. Fig. 14 represents a section on line $b$—$b$, Fig. 12. Figs. 15, 16 and 17 represent sectional views showing portions of the capping device. Fig. 18 represents a side elevation of a portion of the capper slide and arm connected therewith. Fig. 19 represents a side elevation of a portion of the machine showing a different mechanism for bringing bottles into operative position with respect to the valves of the filling means from that shown in the previous figures. Fig. 20 represents a plan view of a different form of capper from that shown in Fig. 12. Fig. 21 represents a sectional view on line $c$—$c$, Fig. 20. Fig. 22 represents a view of a portion of the bed plate of the capper shown in Fig. 21. Fig. 23 represents a sectional view on line $d$—$d$, Fig. 20. Figs. 24 and 25 represent bottom plan views of boxes or receptacles for carrying the bottles.

In the present instance, I have chosen to show my improved bottle capping mechanism as embodied in a machine wherein the bottles are both filled and capped. The filling mechanism, however, is not herein claimed.

Similar numerals of reference indicate corresponding parts in the figures.

Referring to the drawings: I have found in practice that in bottle filling machines it is necessary to deliver bottles or receptacles to be filled to a position beneath the filling means and to hold the bottles in this position while the filling means are actuated to fill the bottles and, after the filling means are again closed, to remove the bottles already filled and place the same beneath the capping means and to place another set of bottles under the filling means, the filled bottles being adapted to receive the cap after which this set is removed and the next set of bottles filled, is placed beneath the capping means.

In the drawings, I have shown a construction for accomplishing this result but it will be evident that changes may be made therein without departing from the spirit of my invention and other instrumentalities may be employed which will accomplish the same result and I do not therefore desire to be limited in every instance to the exact construction as herein shown and described but desire to make such changes as may be necessary.

1 designates the frame of the machine which may be of any desired construction, and at suitable points thereon, preferably at the ends, I mount two sprockets 2 on opposite sides of the frame and two sprockets 3 on the opposite sides of the frame, and in suitable bearings thereon.

4 designates a wheel or pulley to which power is applied in any suitable manner and from any suitable source, said pulley 4 being mounted on the drive or power shaft 5 suitably journaled and which is provided with the gear or miter 6 in mesh with the gear 7 carried on the worm shaft 8, carrying the worm 9, which is in mesh with the worm gear 10 carried on the worm-gear shaft 11, which is suitably supported. Carried by the worm gear shaft 11 is an intermittent or mutilated gear 12 the teeth of which mesh at the proper time with a mutilated or intermittent gear 13 carried by the shaft 14 which is suitably supported, and which carries the gear 15, in the present instance shown as beveled, which is in mesh with a gear 16 carried on the rod 17, said rod having a suitable gear 18 thereon meshing with a gear 19 mounted on the shaft 20 which supports the sprocket wheels 2, by which means it will be understood that the sprockets are actuated.

Around the sprockets 2 and the sprockets 3, pass the conveyer, which consists of chains 21 connected by the cross bars 22 formed, in the present instance, of angle irons, which are set at a suitable distance apart, in order to receive and carry the receptacles or boxes containing the bottles. It will be understood more especially from Fig. 6 that the intermittent or mutilated gear 12 is provided with the teeth 23 extending a short distance on its face and the remaining surface 24 of said gear 12 is plain and adapted to ride the plain surfaces 25 on the gear 13 at the proper time, said faces 25 in the present instance being three in number and said gear being provided with the teeth 26 adapted to mesh with the teeth 23 on the gear 12 so that the latter will be intermittently operated, so that when the teeth 23 are in mesh with the teeth 26 the shaft 14 is rotated and also the gears 15 and 16 and thus the shaft 17 which will actuate the sprockets 2 to the conveyer until the plain face 24 and one of the faces 25 contact, at which time the conveyer will be stopped or halted in its movement. Also carried on the worm gear shaft 11 is an intermittent gear 27 which actuates the bottles or the filling means to bring the same into operative position, said gear being provided with two sets of teeth 28 and 29, in the present instance, between which are the two plain surfaces 30 and 31, the said teeth of the gear 27 meshing at the proper time with the teeth 32 of the lifter gear 33 which is also provided, in the present instance, with the two plain surfaces 34 adapted to contact at the proper time with the surfaces 30 and 31 of the gear 20, as will be hereinafter described.

The lifter gear 33 is carried by the lifter shaft 35 which is suitably journaled in the frame of the machine and which has connected therewith, on opposite sides thereof, cranks 36 carrying the crank pins 37 and connected in any suitable manner with the crank pins 37 are the rods 38 which are pivotally connected at 39 with the heads 40 which carry the arms 41 which support the lifter 42, it being understood that the heads 40 are suitably guided in the frame 1 of the machine, in order that a proper vertical movement will result, which carries the arms 41 and the lifter 42 up and down and by reason of the connection of the rods 38 with the heads 40 a reciprocating movement will be imparted to the lifter 42 at the proper time; a certain dwell in the movement of the lifter 42 being accomplished by means of the faces 34 on the gear 33 when contacting with the faces 30 or 31 on the gear 27, so that the bottles are not elevated until the proper time and when elevated will be held a proper time to permit of the filling action. It will be noted that the lifter 42 is situated directly beneath the valves 43 of the filling means. The filling means consists of a tank 44 suitably supported upon the frame of the machine which tank is adapted to contain milk or other fluid for the bottles and in the lower wall or bottom of the tank 44 are connected valves 43 which may be of any number, in the present instance, I have shown a series of five valves lengthwise of the machine and seven across the machine, although it will be understood that any number of these valves may be employed depending upon the number of bottles to be held in the receivers or boxes. The tank 44 is provided with a suitable valve mechanism 45 and a float 46 for controlling the level of the fluid in said tank. The valves are of any suitable construction for automatic operation and, referring to Fig. 7, it will be noted that the same consists of the body 47 which is connected with the bottom wall of the tank 44, the body being provided with the ports or openings 48 and being reduced to form a neck 49 beneath the ports 48.

Movably mounted on the body portion is a sleeve 50 having a seat 51 thereon in which is preferably seated rubber 52 or other resilient material for receiving the mouth of the bottle.

The reduced neck 49 carries the valve seat $49^x$ which is of any suitable dimension and with which is adapted to contact the valve $50^x$ carried on and movable with the sleeve 50, it being understood that when the valve $50^x$ and the valve seat $49^x$ are in contact, no escape of the fluid through the ports 48 is permitted, but that when the sleeve 50 is elevated, as hereinafter described, the valve $50^x$ is removed from contact with its seat $49^x$ and the ports 48 are thus opened, permitting escape or flow of the milk or other fluid. It will be understood that the extent of the seat 49ˣ and of the valve 50ˣ can be of any suitable length in order to provide a cut-off to properly control the flow of the fluid.

Between the stop 53 on the body 47 and the seat 51 is a coiled spring 54 which normally holds the parts in the position seen in Fig. 7 with the ports 48 closed. Carried on the reduced portion 49 of the body 47 is a head 55 having a port 56 therein communicating with the interior of the body and connected with the reduced neck 49 of the body below the ports 48 in a tube or pipe 57, which passes upwardly through the body 47 to a suitable point above the liquid in the tank 44, it being noted that the pipe 57 with the bore of the reduced neck 49 forms a continuous passage from the port 56 to a point above the surface of the liquid, as above stated. It will be understood from this, that when the bottles are raised with the boxes a mouth of each of the bottles contacts with one of the rubbers 52 carried by one of the seats 51 and that the sleeve 50 will be lifted and open the ports 48 and the milk or other fluid will pass from the tank 44 through ports 48 and be directed into the bottles, air from the latter passing through port 56 to the bore of the neck 49 and pipe 57 and to a point above the liquid in the tank 44.

As soon as the bottles are lowered again the spring 34 immediately closes the ports 48 in the valves and no further liquid will escape, this being timed with the other mechanism in order to just fill the bottle. The bottles now being filled it is necessary to place the same beneath the capping means and to operate the latter. Upon one side of the machine, I provide one of the cranks 36 with the teeth 58 forming a gear, which meshes with a sprocket 59 suitably mounted on the frame of the machine and which is in mesh with a crank sprocket 60, which is carried on a shaft 61 extending across the machine and having a similar crank 62 on the opposite side. Connected with the said cranks 60 and 62 are rods 63 which are pivotally connected at 64 with the heads 65 between which and mounted on the frame 1 is the stationary bed plate 66 of capper. The heads 65 carry the cross bar 67 which supports the capping plunger and caps, it being understood that as the cranks 60 and 62 are rotated a reciprocating motion is imparted to the heads 65 and to the cross bar 67, raising and lowering the capping mechanism the necessary distance. Carried by the cranks 60 and 62 are cams 68 with which contact the rollers 69 which are suitably connected with a frame 70 suitably guided in the frame 1 of the machine and which carries a plate 71 upon which is mounted a plurality of bottle holders 72 of any desired shape, it being understood that by reason of the rotation of the cranks 60 and 62 the cams 68 will impart a reciprocating motion to the rollers 69 and thus to the frame 70 and plate 71, the movement of which is timed so that when the capping mechanism is lowered the plate 71 and with it the bottle holders 72 are elevated so that the bottles are raised from the boxes or receptacles and placed in the proper position for receiving the caps.

The bed plate 66 is depressed at 73 in order to form a support for the capping devices at different heights, the lower side of the bed plate supporting the capping devices for the pint bottles while the higher side of the bed plate 66 supports the capping devices for the quart bottles, it being understood that the boxes are placed upon the proper side of the conveyer so that the pint and quart bottles are properly positioned with respect to the cappers.

Any number of capping devices may be employed but preferably they correspond in number to the valves of the filling means and as all of these capping devices are preferably the same, a description of one, will suffice for all.

At a suitable point in the bed plate 66 are provided openings 74 the walls of which are preferably recessed in order to receive wings or lugs 75 on the guide 76 for the mouths of the bottles, the inner wall of said guide 76 being inclined as at 77, see Fig. 14, in order to properly position the mouth of the bottle for the reception of the cap. The guide 76 is carried by rods 78 which pass through openings in the bed plate 66 and are guided by sleeves 79 suitably supported, a suitable spring 80 being adapted to normally hold the guide 76 in the position seen in Figs. 13 and 14. Carried on the bed plate 66 adjacent the openings 74 therein, are the guides 81 on opposite sides of said openings, said guides having the tracks 82 which are provided with the cutaway portion 83 directly at the point where the openings 74 are situated in the bed plate.

Laterally movable between the guides 81 is the cut-off slide 84 and the means for reciprocating this slide will be hereinafter described. At suitable intervals in said slide are openings 85 which are so formed as to make, when moved in the proper position with the cut-away portion 83 in the tracks 82, a suitable opening for permitting the passage of the cap therefrom, the openings 85 of said slide 84 having on opposite sides and at the lower portion thereof, the small lugs 86 for purposes to be hereinafter described, it being noted that the slide 84 is of suitable height above the tracks 82 to equal a thickness of one of the caps 87. Secured to the bed plate 66 and between the openings 74 therein are magazines or containers 88 for the stack of caps 87, the mouth of said magazines being situated over the slide 84 and within each of said magazines is a weight 89 in order to feed down the caps 87, it being noted that the magazines 88 extend upwardly through openings in the cross bar 67 and as these magazines are carried by the bed plate 66 they are stationary and the cross bars 67 reciprocate without imparting motion to the magazines.

Suitably connected with the cross bars 67 are plungers 90 which are suitably guided and are situated directly over the openings 74 in the bed plate 66, said plungers being reciprocated by the movement of the cross bars 67. In order to impart a reciprocating movement to the slide 84 so that the cap is properly positioned over the openings 74 in order to be inserted into position in the bottles by the plunger 90, I provide a cam groove 91 having a plurality of rollers, upon the beveled gear 15, and by reason of the rotation of the cam groove and the rollers, with which an end 93 of the pivoted arm 92 is engaged, the opposite end of the lever 92 is raised and lowered and as this end of the lever is connected with a lever 94 which is suitably journaled in the frame of the machine, the lever 94 is reciprocated. This lever 94 imparts movement to the arm 95 which is connected by the link 96 with a lever 97 which has a hook arm 98 thereon in engagement with a suitable device 99 on the slide 84 so that the arm 97 is rocked on its support and reciprocates the plate 84 backward and forward between the guides 81. As will be seen from Fig. 13, the openings 85 in the slide 84 are each beneath one of the magazines 88 and by reason of the position of the tracks 82 and the height of the slide 84, the lowermost cap 87 rests upon the tracks 82 and is engaged by the wall of the opening 85 in the slide 84. As the slide is reciprocated it moves forwardly carrying the lowermost cap from beneath the magazine a suitable distance along the tracks 82 while the solid portion of the slide 84 passes beneath the stack of the caps 87 and holds the same in the magazines. The cap which has been removed moves along the tracks 82 until the cut-away portion 83 thereof is reached, whereupon the cap will fall through the openings 85 and engage with and be held by the lugs 86 on the slide 84. The bottles meantime have been elevated as previously described and the mouth thereof contacts with the guide 76 which raises the same against the tension of the springs 80 on the rods 78 bringing the bottle directly in position for the cap and the plunger 90 meantime is being lowered by the reciprocation of the cross bar 67 and removes the cap past the lugs 86 and forces the same into proper position into the bottles. The return movement of the slide 84 is caused by the lever 92, and the openings 85 in the slide are again placed beneath the stack of caps 87 and the next succeeding one thereof falls upon the tracks 82 ready for the next operation.

The operation of the machine will be apparent, from the above, it being understood that the various operations are so timed with respect to each other and the dwells caused by mutilated or intermittent gears so arranged that all the parts work at the proper time with respect to each other and are automatic. The bottles are placed in the boxes 100, the same depending upon the size of the bottles, that is, whether quarts or pints, the construction formed being shown for quarts, Fig. 25, and for the pints in Fig. 24. The boxes are now placed upon the conveyer 21 between the cleats 22 and power having been imparted to the pulley 4, the shaft 5 is rotated, rotating the gear 6 which imparts motion to the gear 7 and thus to the worm shaft 8 which rotates the worm 9 and thus the worm gear 10. This will actuate both of the mutilated gears 12 and 27 and through the medium of the mutilated gears 13 and 33 respectively, the various parts are operated and caused to dwell at a predetermined time. The gear 13 rotates the shaft 14 and the gears 15 and 16, which latter is connected with the rod 17 and imparts a forward movement to the conveyer 21, which is moved forward a sufficient distance in order to place the first set of bottles beneath the filling means at which time a predetermined dwell occurs in the mutilated gears so that the conveyer is stationary. At the same time, through the medium of the cranks 36 and the rods 38 the lifter 42 is elevated carrying the bottles and boxes therewith and moving the same upwardly from the conveyer bringing the mouth of the bottles into contact with the seats 51 of the valves and opening the latter as previously described so that the fluid will fill the bottles after which the lifter is returned to its normal position and the boxes again placed upon the conveyer which is actuated again and moves the boxes forwardly into position beneath the capping devices. The gear 27 is rotating and is so timed that proper movement is imparted to the cranks 36 and, through the medium of the sprockets 59 and the cranks 60 and 62 with which are connected the rods 63, lowers the plates 65 and with them the cross bar 67. In the meantime the rollers 69 are properly actuated by the cams 68 to elevate the bottle holders 72 which are so formed as to pass up between the rods forming the bottom of the boxes 100 and will elevate the bottles causing the mouths thereof to contact with the guides 76. In the meantime, the arm 94 is properly reciprocated in order to cause the slide 84 to be moved over a suitable distance to place a cap 87 into proper position above each of the openings 74 in the bed plate 66, in order to be acted upon by the plungers 90 which have been lowered with the cross bar 67 and will force the caps into the mouths of the bottles and into the proper position therein, it being understood that the dwell in the movement of the bar 67 is timed accordingly to allow for this. The plate 71 with the bottle holder 72 is then lowered returning the bottles to their boxes. In the meantime, another set of boxes with the bottles therein is presented in the proper place beneath the filler and have been filled, as before described. The conveyer is now moved forward again and the boxes containing the filled and capped bottles are removed from the conveyer while the next set of filled bottles are presented to the cappers and properly capped, this action continuing as desired. In order to hold the chains 21 at their proper tension, I provide the sprocket 101 mounted upon the pivoted arm 102 with which is connected the adjusting screw 103, one of these being on each side of the machine and by proper manipulation of the adjusting screw 103 the chain 21 will always be held at the proper tension. In lieu of raising the boxes containing the bottles to the filling valves, I may lower the tank 44 containing the fluid and with it the valves so that said valves may be brought into contact with the mouth of the bottles as hereinafter described. This construction I have shown in Fig. 19 in which the tank 44 is mounted upon the plate 104 which is connected with the rod 38 in place of the head 40, the operation of the parts being the same as previously described and the bottles being filled as before, it being understood that the plate 104 is suitably guided in the frame of the machine.

In place of the feeding mechanism for the caps as described, I may change the openings in the slide 84, which may be operated as previously described, this construction being shown in Figs. 20, 21, 22 and 23 and in which on the wall of the openings 105 of the slide, I provide a lug 106 which is adapted to receive the lowermost cap 87 of the stack and the same is carried forward by the slide 84 in its movement to its position over one of the openings 74 in the bed plate 66. The plunger 90 is then actuated by the reciprocation of the cross bar 67 which will force the cap from the lug 106 and into proper position in the mouth of the bottle.

In Fig. 2, I have shown a bar 107 connected with the lever 94 and also with an arm 108, one end of which is pivoted to the frame of the machine and is provided with a handle 109, and by proper movement of the handle, the lever 94 is so moved as to be released from engagement with the lever 92 or connected therewith, so that the slide 84 may be reciprocated or not, as desired. The lever 94 is provided with a seat 110 therein for the reception of a pin 111 on the pivoted lever 92 for the purpose of this connection. Suitable stops 112 prevent improper movement of the arm 108.

Having thus described my invention, what I claim as new and desire to secure by Letters Patent, is:—

1. In a device of the character described, a bed plate having openings therein, a plurality of magazines carried by said bed plate and each situated adjacent an opening, a plunger situated over each opening, means for actuating said plungers, a cut-off slide adapted to remove a cap from each magazine and place the same over one of the openings, said slide having openings provided upon opposite sides and at the lower portion thereof with lugs.

2. In a device of the character described, a bed plate having openings therein, a plurality of magazines carried by said bed plate and each situated adjacent an opening, a plunger situated over each opening, means for actuating said plungers, a cut-off slide adapted to remove a cap from each magazine and place the same over one of the openings, said slide having openings provided upon opposite sides and at the lower portion thereof with lugs, said bed plate having guides on opposite sides of its openings and said guides having tracks provided with cut-away portions opposite the openings in the bed plate.

3. In a device of the character described, a bed plate having a plurality of openings therein, magazines carried by said bed plate, a plunger situated over each of said openings, a slide having suitable openings therein to receive a single cap from a magazine, a lever movable in the frame of the machine, a rocking lever connected with said first named lever and pivotally connected with the slide, a lever mounted intermediate said movable and rocking levers, and a cam for actuating said rocking lever, whereby said slide is reciprocated.

4. In a device of the character described, a bed plate having a plurality of openings therein, magazines carried by said bed plate, a plunger situated over each of said openings, a slide having suitable openings therein and lugs upon opposite sides thereof at its lower portion to receive a single cap from each of the magazines, a lever movable in the frame, a rocking lever connected with said first named lever and pivotally connected with the slide, a cam for actuating said rocking lever whereby said slide is reciprocated, said rocking lever being provided with a seat and means for throwing means on the movable lever into or out of engagement whereby said slide is reciprocated or not, as desired.

5. In a device of the character described, a bed plate having a plurality of openings therein, magazines carried by said bed plate, a plunger situated over each of said openings, a slide having suitable openings therein and lugs upon opposite sides thereof at its lower portion to receive a cap from each of the magazines, a lever movable in the frame, a rocking lever connected therewith and pivotally connected with said slide, means for actuating said rocking lever to reciprocate the slide, and means on said movable lever whereby said slide may be reciprocated or not as desired.

6. In a device of the character described, a bed plate having a plurality of openings therein, magazines carried by said bed plate and adapted to contain the caps, a slide adapted to be reciprocated for removing one cap at a time from the magazines and placing the same over an opening in said bed plate, an endless conveyer having means for engaging bottle holders, a cross bar adapted to be reciprocated, plungers carried thereby and adapted to be raised and lowered therewith, rods carried by said cross bar and guides carried by said rods adapted to direct the mouth of the bottle into proper position for receiving a cap.

7. In a device of the character described, a bed plate having a plurality of openings therein, magazines carried by said bed plate and adapted to contain the caps, a slide adapted to be reciprocated for removing one cap at a time from the magazines and placing the same over an opening in said bed plate, a cross bar adapted to be reciprocated, plungers carried thereby and adapted to be raised and lowered therewith, rods carried by said cross bar, guides carried by said rods adapted to direct the mouth of the bottle into proper position for receiving a cap, and a resilient support for each of said guides.

8. In a device of the character described, a bed plate suitably supported and having openings therein, magazines carried by said bed plate, a plurality of plungers suitably supported, means for reciprocating said plungers, a cut-off slide having openings therein adapted to receive a cap from each of the magazines, means for reciprocating said slide whereby a cap is placed beneath each of the plungers, a lug projecting from the walls of each of said slide openings for holding the caps, an endless intermittent carrier for placing bottles beneath the plungers, and bottle holders carried by said carrier and adapted to be raised and lowered in order to place the bottles in proper position with respect to the plungers and caps.

9. In a device of the character described, a bed plate suitably supported having openings therein, magazines carried by said bed plate, guides adjacent said openings and having tracks thereon, said tracks being cut away at intervals, plungers movably supported over the openings in said bed plate, means for reciprocating said plungers, a slide having openings therein adapted to receive a single cap from each of the magazines, said cap being adapted to move upon said tracks, and means for reciprocating said slide whereby a single cap from each magazine is placed beneath the plunger and over an opening in the bed plate.

10. In a device of the character described, a bed plate suitably supported and having openings therein, magazines carried by said bed plate, a plunger situated over each of said openings in said bed plate, means for reciprocating said plungers, guides supported on said bed plate adjacent said openings, tracks on said guides having a cut-away portion at the openings in the bed plate, a slide having openings for receiving the lowermost cap in each of the magazines, said caps resting upon the tracks, means for reciprocating said slide for removing the lowermost cap and placing the same over an opening in the bed plate, and lugs projecting from the walls of the openings in said slide adapted to receive the cap and hold the same until removed therefrom by the plunger.

WILLIAM J. CUNNINGHAM.

Witnesses:
    WM. CANER WIEDERSEIM,
    C. D. McVAY.